United States Patent [19]

Charpak

[11] Patent Number: 5,032,729

[45] Date of Patent: Jul. 16, 1991

[54] PROCESS AND DEVICE FOR DETERMINING THE SPATIAL DISTRIBUTION OF ELECTRONS EMERGING FROM THE SURFACE OF A RADIOACTIVE BODY

[76] Inventor: Georges Charpak, 37 Rue de la Plaine, 75020 Paris, France

[21] Appl. No.: 422,958

[22] Filed: Oct. 18, 1989

[51] Int. Cl.$^5$ ............................................. G01T 1/185
[52] U.S. Cl. .................................. 250/385.1; 250/374
[58] Field of Search ............................. 250/374, 385.1

[56] References Cited

U.S. PATENT DOCUMENTS

| 4,286,158 | 8/1981 | Charpak et al. | 250/385.1 |
| 4,670,656 | 6/1987 | Bolon | 250/385.1 |
| 4,686,368 | 8/1987 | Anderson et al. | 250/385.1 |

FOREIGN PATENT DOCUMENTS 0282665  9/1988  European Pat. Off. .

OTHER PUBLICATIONS

Conde et al., "The Argon Uniform-Field Gas Proportional Scintillation Counter: Improved Energy Resolution for α-Particles and its Behaviour for X-Rays", Nucl. Instrum and Methods, 124 (1), Feb. 1975, pp. 307-308.

"Studies of Light Emission by Continuously Sensitive Avalanche Chambers" by Charpak et al., Nuclear Instruments and Methods in Physics Research, A269 (1988), pp. 142-148.

Primary Examiner—Carolyn E. Fields
Attorney, Agent, or Firm—Helfgott & Karas

[57] ABSTRACT

A device according to the invention includes: a gas detector, comprising at least one chamber (2) and containing a noble gas and a gas or vapor that emits photons between two parallel electrodes (3a, 3b) between which a continuous high voltage (HT) is applied, whereby a first electrode (3a) is intended for receiving, against its external face, the surface of the radioactive body (5,6) to be observed; a brilliance amplifier (13) arranged for receiving the photons emitted by the excited atoms which are produced in the vicinity of a second electrode (3b) by the electron avalanche ascribable to the electrical field between the first and second electrodes; a camera (12) arranged behind the brilliance amplifier; and computing means (15) capable of computing, from the output signal of the camera, the entrance points (9) in said gas detector, at the first electrode, of the electrons emerging from said surface of the radioactive body.

12 Claims, 2 Drawing Sheets

PROCESS AND DEVICE FOR DETERMINING THE SPATIAL DISTRIBUTION OF ELECTRONS EMERGING FROM THE SURFACE OF A RADIOACTIVE BODY

BACKGROUND OF THE INVENTION

The present invention relates to the determination of the spatial distribution of electrons emerging from the surface of a radioactive body.

It more particularly applies to techniques employed in biology.

It is common practice to identify the location of molecules within a certain body or medium, by marking or labelling same with radioactive substances and by determining the position of the electrons emerging from the radioactive body or medium containing these molecules.

The most common technique used for determining this distribution is autoradiography which consists in placing a sample, such as a thin section containing the labelled molecules, against a photographic film, which has been exposed by the electrons (or β-rays) emitted by the radioactive elements of these molecules.

The disadvantages of autoradiography are threefold:

an extremely long time (often several months) is required in order to be able to observe spots on the photographic film, for example in the case of sections of biological tissues;

an expensive apparatus is required in order to measure the photographic densities of the spots whenever quantitative informations are desired on the relative distributions of radiation intensity and therefore on the concentration of radioactive substances;

the accuracy as to the intensity of radiation is limited by the relatively reduced dynamic range of the photographic films, on the one hand, and by the relatively high background noise of same, on the other hand, particularly in the case of a very long exposure time, which is necessary as previously stated.

In return, autoradiography makes it possible to obtain a very high spatial accuracy, of about a few microns, which cannot be obtained by other conventional imaging processes, since the limitation in spatial accuracy solely results from the physical dimension of the distribution of the radioactive spot.

It has been proposed to accelerate the determination of the location of molecules labelled with radioactive elements within a body, by employing gas detectors which, in response to an electron emitted by the labelled molecules, produce an ionization giving rise to an electric pulse capable of being located, after having been submitted to an appropriate multiplication in the gas. As gas detectors, multiwire chambers have in particular been proposed.

The drawback of the gas detectors, in particular of the multiwire chambers, is the frequently considerable travel path of the electrons, emitted by the labelled (radioactive) molecules in the gas of the detector, which tends to limit the accuracy of the location of the labelled molecules. Actually, the travel at atmospheric pressure, may reach several hundreds of microns, when the molecules are labelled with tritium which emits low energy electrons or β-rays (on an average at 6 KeV approximately), and tens of centimeters, when they are labelled with phosphorus 32 which emits high energy electrons (on an average at 600 keV approximately).

With a view of eliminating the aforesaid drawback of the gas detectors, Petersen, Charpak, Melchart and Sauli suggested, in Nuclear Instruments and Methods 176 (1980) p. 239–244, a gas detector in which the amplification of the ionization electrons released in the detector gas is preferentially performed on electrons released in the vicinity of the detector surface against which the body to be examined and containing the labelled molecules is placed, thereby allowing an increased accuracy, about a few hundreds of microns, even in the case of electrons emitted by phosphorus-32, as can be seen from an article by Bateman, Stephenson and Connolly in Nuclear Instruments and Methods in Physics Research A 269 (1988) 415–424.

It should be noted that the gas detectors of the various above-mentioned types are provided with electrodes consisting in particular of wires, and that the location of the avalanches of multiplication, which are generated in the detector gas by the electrons originating from the radioactive body, is based on the detection of electrical pulses generated in these electrodes by the movement of the electrons and ions produced by the avalanches.

Contrary to the autoradiography approach on the one hand, and the gas detectors with the detection of the electric pulses produced in the electrodes, on the other hand, the present invention is based on the detection of the avalanches produced in a gaseous medium, in response to the electrons emitted by the radioactive body to be examined, by optical means which detect the ultraviolet or visible photons emitted by the avalanches.

On the other hand, an article of Charpak, Dominik, Fabre, Gaudean, Sauli and Suzuki in Nuclear Instruments and Mehods in Physics Research A 269 (1988), 142, discloses a detector implementing the optical detection of the avalanches produced by the electrons which are multiplied in an intense electrical field, these electrons being produced by ionization reactions, whereas the avalanches are produced between parallel grids between which a continuous high voltage is applied and the optical detection of the avalanches is made by a system which successively incorporates an image converter, an image intensifier and a CCD-type camera (charge coupled device camera), optically coupled to an image intensifier by optical fibres.

However, this last mentioned article in no way contemplates aPplying the gas detector described therein to the optical detection of the electrons emitted by radioactive bodies, and does not provide any teaching suggesting such an application.

OBJECT OF THE INVENTION

It is precisely the object of the invention to perform, by implementing means analogous to the ones described in this last article, the detection of avalanches produced by the electrons or β-rays emitted by a radioactive body, in order to be subsequently able to determine, by appropriate computing means, the location of the sources of electrons or β-rays constituted by the labelled molecules of the body, most especially for medical imaging uses.

Therefore, the object of the invention is to provide:

on the one hand, a process intended for determining the spatial distribution of the electrons emerging from the surface of a radioactive body, wherein said surface is arranged against the entrance face of a gas detector, incorporating at least one chamber and containing, between electrodes, a noble gas and a gas or vapor which emits photons in response to the impact of electrons, and wherein the position of the impacts, in the detector, of the electrons originating from said surface is determined by observing the photons created by an electronic avalanche, due to a multiplication between these electrodes, by an apparatus tracking the photons and calculating the center of gravity of the distribution of these photons:

on the other hand, a device for determining the spatial distribution of the electrons emerging from the surface of a radioactive body, by implementing the aforesaid process, said device comprising in combination: a gas detector including at least one chamber and containing a noble gas and a gas or vapor which emits photons between two parallel electrodes between which a continuous high voltage is applied, whereby a first electrode is intended for receiving on its external face, the surface of the radioactive body to be observed; a brilliance amplifier provided for receiving the photons emitted by the excited atoms which are produced in the vicinity of a second electrode by the electronic avalanche due to the electrical field between the first and second electrodes: a camera arranged behind the brilliance amplifier: and computing means capable of calculating, from an output signal of the camera, the entrance points in said gas detector, at said first electrode, of the electrons emerging from said surface of the radioactive body.

Advantageously:

the surface of the radioactive body located against the entrance face of the gas detector is coated with an electrically conductive layer transparent to β-rays or electrons emitted by the radioactive body;

the camera is of the CCD-type;

the electrodes are constituted by grids;

the noble gas is xenon or argon; and the photon-emitting gas or vapor is selected from the group consisting of triethylamine, tetrakis(dimethylamine-ethylene), nitrogen or water vapor.

There can be provided either a single chamber containing the noble gas and the photon-emitting gas or vapor, or two chambers arranged one behind the other, the first one performing a preliminary electronic amplfication and the second one transforming the electrons, originating from the first chamber, into a more intense avalanche, the two chambers being filled with the same photon-emitting gas or vapor and with noble gas.

The Computing means are generally programmed in such a way as:

to calculate the center of gravity or the maximum of the distribution of photons produced by an avalanche (in fact the apex of a curve representing the distribution of avalanches, since the ionization electrons released into the gas by the β-rays or electrons are preferentially multiplied when they have to cover a great distance, which favors the electrons released at the entrance of the chamber) or, alternately, to carry out the calculation of another mathematical algorithm better suiting the spatial distribution of the avalanches in specific cases.

Anyhow, the obtained accuracy on the point of entrance in the gas detector, at the first electrode, of each electron emitted by the radioactive body is substantially superior to the physical extension of the avalanches which may reach, for each initial ionization electron, a value of the order of one millimeter, the accuracy being at least ten times higher, that is superior to one tenth of a millimeter.

The invention will, in any case, be better understood by means of the following additional, non-limiting, detailed description, as well as by means of the attached drawings.

BRIEF DESCRITION OF THE DRAWINGS

FIGS. 1 and 2 show, schematically and in cross-section, two embodiments of a device in accordance with the invention, and FIG. 3 is a schematic view of yet another embodiment of the invention.

DETAILED DESCRIPTION OF THE PREFERRED EMBODIMENTS

According to the invention, a process and a device for determining the spatial distribution of the electrons emerging from the surface of a radioactive body, may be realized as follows.

Figure 1:
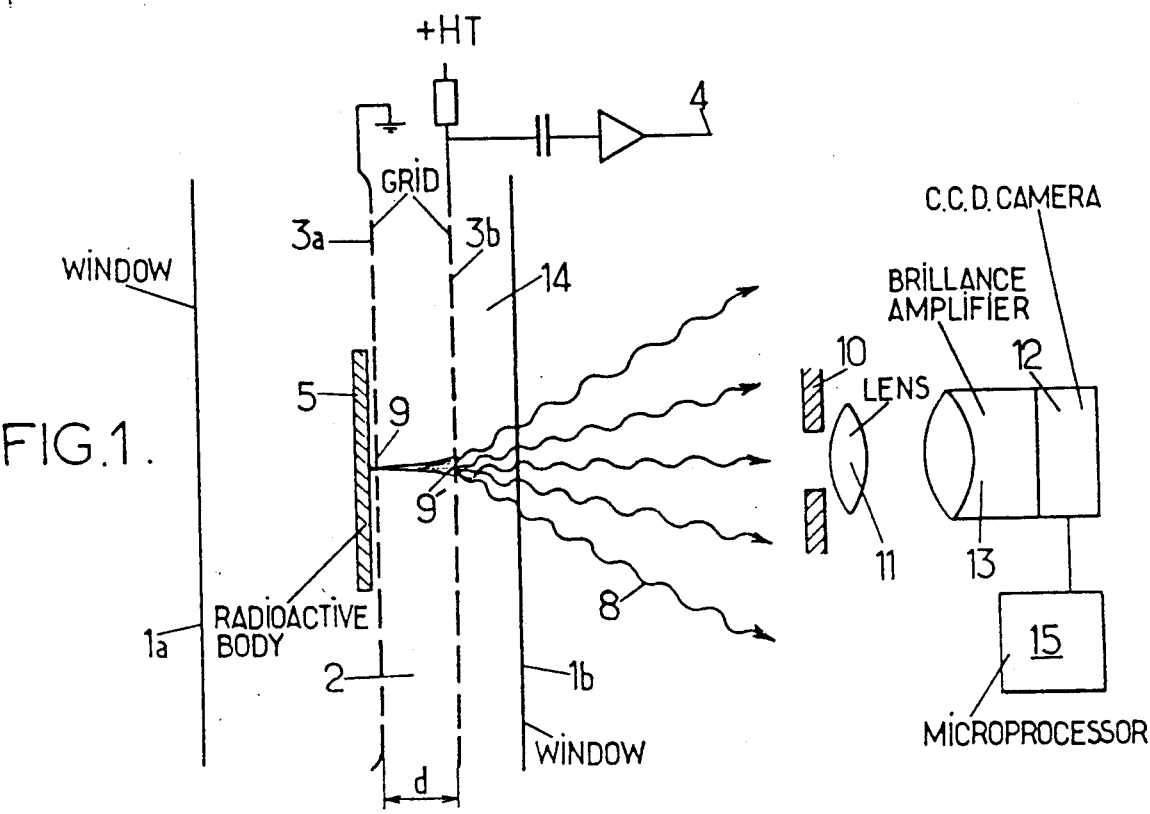
Figure 2:
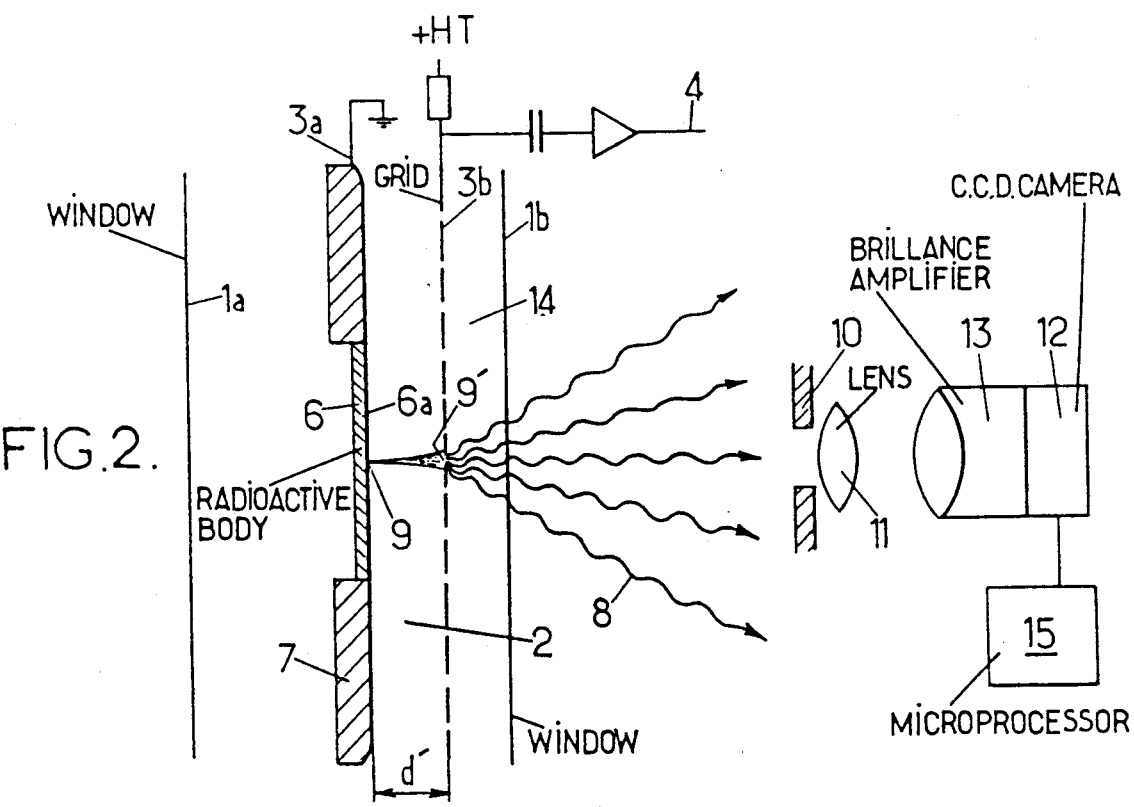

The device incorporates, between two windows $1a$, $1b$ the second one $1b$ being at least made out of "Aclar" (polychlorotrifluoroethylene) or out of any other material which is transparent to the photons emitted by the radioactive body, a chamber 2 of gas detector defined by two electrodes $3a$, $3b$ constituted by grids formed in the example by wires having a diameter of 50 microns and spaced at a distance of 500 microns: these electrodes are separated by a gap d of e.g. about 4 mm in the case of FIG. 1 or d' of e.g. about 6 mm in the case of FIG. 2.

A high voltage current+HT is applied to grid $3b$, whereas grid $3a$ is connected to the ground, in such a manner to ensure a high voltage potential difference of the order of 3500 V (approximately 10,000 V/cm), for example, between the two electrodes, the charge signal being available at 4.

The radioactive body to be observed, referenced 5 in FIG. 1, is placed directly against the first grid-electrode $3a$.

Conversely, in the embodiment of FIG. 2, the radioactive body 6 to be examined is coated with a thin electrical conductive layer $6a$ which is however transparent to the electrons emitted by the body. For example, there has been applied a gold film $6a$, having a thickness of 100 Angströms, on a section 6 of a rat's kidney by means of a conventional apparatus used in electronic microscopy in order to perform a cathodic gold spraying. The electrons (on an average at 6 keV) emitted by tritium, which is used for labelling the molecules of the kidney section, can easily pass through such a layer. This thin gold film may be replaced by a film transparent to electrons consisting of another metal or of tin oxide. The radioactive body 6 is maintained in a perforated plate 7 consisting of a conductive metal, for example copper.

It should be noted that when phosphorus 32 is used for labelling the molecules, the electrons emitted by same have sufficient penetrating power (on an average 600 keV) to allow the use a plastic foil, for example a six micron-thick Mylar foil, in order to separate the radioactive body 5 or 6 from the grid-electrode $3a$.

The photons 8 resulting from the impact in 9', in the vicinity of the second grid-electrode $3b$, of most of the electrons from the avalanche produced by the ionization electrons generated by the electrons emitted by the radioactive body 5 or 6, can be observed through a diaphragm 10 and a focussing lens 11, via a CCD-type camera 12, equipped with a light amplifier 13.

Now, the gas volume 14 of the gas detector arranged between the grids electrodes $3a$ and $3b$ of the single chamber 2 of the embodiment of FIGS. 1 and 2, consists of a gas mixture containing a noble gas and a photon-emitting gas or vapor. In particular, there has been used a mixture consisting of 96.5% of xenon and of 3.5% of triethylamine, xenon and triethylamine achieving an electronic amplification and triethylamine the emission of photons.

In fact, an exponential avalanche of electrons is produced by the electrical field between the electrodes $3a$ and $3b$ (between which the high voltage HT is applied) and the image of the end of this avalanche is detected.

The light is mainly emitted against the second electrode $3b$. It is produced by the atoms excited in the avalanche induced by the electron closest to the first electrode $3a$. In view of the exponential character of the multiplication, the largest avalanche is produced by this very electron and makes it possible to overcome the stumbling block constituted by the long travel path of the $\beta$-rays or electrons.

The devices of FIGS. 1 and 2 have been used for studying a 20-micron thick section of a rat's kidney labelled with tritium and as a result anatomical details of 30 to 40 microns in size could be obtained within 30 hours (whereas approximately 3 months are required in the case of an autoradiography).

There has also been studied the radioactive body constituted by a gel carrying lines or traits of phosphorus 32; the accuracy is solely limited by the physical dimension of the radioactive lines themselves and is superior to the quarter of a millimeter, although the thickness d or d' of the amplifying gaseous gap between the two grids electrodes $3a$ and $3b$ is 4 mm or 6 mm respectively.

In an alternative, there can be provided, instead of a sole chamber, between electrodes $3a$ and $3b$, containing both the normal gas and the photon-emitting gas, two successive amplifying chambers, both of them containing the noble gas and the photon-emitting gas, whereby the merely electrical information of the first chamber (available in 4) can be used with a view to triggering the opening or closing of the brilliance amplifier 13.

Figure 3:
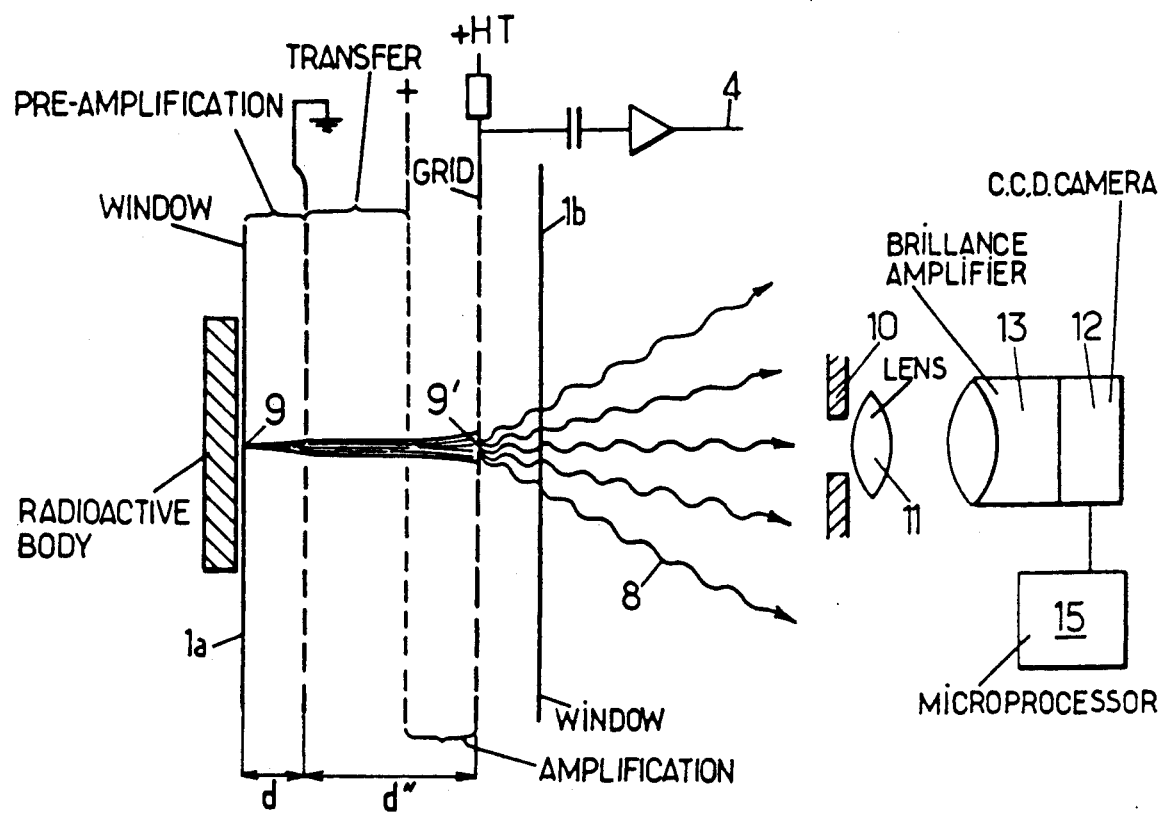

FIG. 3 illustrates the gas detector which has two chambers $2a$ and $2b$ arranged one behind the other, the first one performing a preliminary electron amplification and the second one transforming the electrons originating from the first chamber into a more intense avalanche. The two chambers $2a$, $2b$ are filled with the same gas or vapor that emits photons and with a noble gas.

The output of camera 12 is applied to a microprocessor 15 or any other computer, which is programmed in order to calculate the center of gravity of the distribution of photons produced by an avalanche in chamber 2.

Since there is used an optical detection system with computing capabilities by means of a microprocessor or any other computer, the various results can therefore be stored and an analysis can then be obtained by portions of surface of the image of the radioactive body 5 or 6, by appropriate processing, in the microprocessor or any other computer, of the digital data stored by using the electrical information obtained with electrode $3b$ to direct the optical information into separate memories corresponding to various portions of the image.

In an alternative, the optoelectronical apparatus shown in FIGS. 1 and 2, used for observing the photons 8 and determining the light distribution, can be replaced by a bank of solid state photodiodes, either placed against or close to the grid-electrode $3b$, whereby the photodiode signals make it possible to determine the center of gravity or the maximum of the light pulse; or coupled to the grid electrode $3b$ by scintillating optical fibres transmitting the light emitted by the photon-emitting gas (for example the light emitted by triethylamine is centered on 280 nm).

When placing a sample inside the amplifying space, it is useful to be able to maintain uniform electric field conditions above the sample without spark discharges, in particular on the edge of the sample holder. The sample-holder may for example consist of a microscope slide on which thin anatomical sections (e.g. 20-micron thick) labelled with tritium are deposited, and the distribution of which is to be measured, in such a case there is recommended to cover the sample-holder and the sample with a thin gold layer (50 Angström thick for example) and to place on the periphery of the slide a thin and narrow conductive frame (0.5 mm thickness and 3 mm width approximately) which is brought to an intermediate potential between the cathode potential constituted by the surface of the sample-holder and the potential of the anode against which the avalanches take place. By placing such a frame around each sample-holder, the multiplication can be restricted to the areas located above the radioactive anatomical samples or others and spark discharges ascribable to the surface roughness, generally encountered on the edge of the sample-holding slide, can be avoided.

Needless to say that the invention is in no way limited to the embodiments which have been more specially described herein, but encompasses on the contrary all the equivalents thereof.

I claim:

1. A process for determining the spatial distribution of electrons or $\beta$-rays emerging from a surface of a radioactive body, wherein said surface is placed to actuate a gas detector including at least one chamber with a first electrode and a second electrode and containing, between said first and second electrodes, a noble gas and a gas or vapor that emits photons in response to the impact of electrons, said radioactive body to be observed being placed directly against said first electrode, and wherein the position of the impacts, in the detector, of the electrons originating from said surface is determined by observing the photons, created by an electron avalanche resulting from a multiplication between these electrodes, by means detecting the photons and computing the center of gravity of the distribution of said photons.

2. A process according to claim 1, wherein the surface of the radioactive body placed against said first electrode of the gas detector is coated with an electrically conductive layer that is transparent to the electrons or $\beta$-rays emitted by the radioactive body.

3. A device for determining the spatial distribution of the electrons emerging from a surface of a radioactive body, comprising:
 a gas detector including at least one chamber with a pair of parallelly disposed electrodes and containing both a noble gas and a gas or vapor that emits photons between said electrodes, and means for applying a continuous high voltage between said electrodes, whereby a first electrode of said pair comprises means for receiving, against its external face, the surface of the radioactive body to be observed;
 a brilliance amplifier arranged for receiving the photons that are emitted by excited atoms which are produced in the vicinity of the other electrode of said pair by electron avalanches resulting from an electrical field between said electrodes produced by said continuous high voltage;

a camera arranged behind the brilliance amplifier; and computing means capable of computing, in response to an output signal of the camera, entrance points in said gas detector, at the first electrode, of the electrons emerging from said surface of the radioactive body.

4. A device according to claim 3, wherein said gas detector has one single chamber filled with a mixture of noble gas and photon-emitting gas or vapor.

5. A device according to claim 3, wherein said gas detector has two chambers arranged one behind the other, a first one of said two chambers performing a preliminary electron amplification and a second one of said two chambers transforming the electrons originating from the first chamber into a more intense avalanche, said two chambers being filled with the same gas or vapor that emits photons and with a noble gas.

6. A device according to claim 3, wherein said camera is of the CCD-type.

7. A device according to claim 3, wherein said electrodes are constituted by grids.

8. A device according to claim 3, wherein the noble gas is selected from the group consisting of xenon and argon.

9. A device according to claim 3, wherein the gas or vapor that emits photons is selected from the group consisting of triethylamine, tetrakis(dimethylamine)ethylene, nitrogen and water vapor.

10. A device according to claim 3, wherein said computing means are programmed in order to compute the center of gravity or the maximum of the distribution of photons produced in the detector by an avalanche under the effect of the impact of an electron originating from the radioactive body.

11. A device according to claim 3, wherein said computing means include a memory capable of storing, in the form of digital data, the distribution of photons in various portions of the surface of the radioactive body, the computing means making it possible to recover said distribution by portions of the surface of the radioactive body by using the information contained in electrical signals originating from one of said electrodes.

12. A device according to claim 3, and further comprising a sample holder onto which said radioactive body or sample is placed, said sample holder being provided with spark initiating parts, wherein said parts are covered with a conductive layer set at a voltage intermediate between that of the electrodes.

* * * * *